United States Patent [19]

Lefgren

[11] 4,019,553
[45] Apr. 26, 1977

[54] METHOD FOR MOUNTING AND INFLATING TUBELESS TIRES

[76] Inventor: James I. Lefgren, 311 E., 160 S., Smithfield, Utah 84335

[22] Filed: Dec. 24, 1975

[21] Appl. No.: 644,099

[52] U.S. Cl. .............................................. 157/1.1
[51] Int. Cl.² ...................................... B60C 25/00
[58] Field of Search ..................... 157/1, 1.1, 1.17

[56] References Cited

UNITED STATES PATENTS

| | | | |
|---|---|---|---|
| 3,081,816 | 3/1963 | Branick | 157/1.1 |
| 3,552,469 | 1/1971 | Corless | 157/1.1 |
| 3,596,698 | 8/1971 | Jordan | 157/1.1 |
| 3,651,849 | 3/1972 | Kaminskas | 157/1.1 |
| 3,654,980 | 4/1972 | Rosen et al. | 157/1.1 |
| 3,675,705 | 7/1972 | Corless | 157/1.1 |
| 3,814,163 | 6/1974 | Charles et al. | 157/1.1 |

*Primary Examiner*—Al Lawrence Smith
*Assistant Examiner*—James G. Smith

*Attorney, Agent, or Firm*—Edward E. McCullough

[57] ABSTRACT

A tubeless tire to be mounted is placed on a wheel rim so that a side-wall bead of the tire is in contact with the adjacent wheel rim flange. A plastic, water soluble substance of doughy consistency is then placed in the gap between the opposite side-wall bead and its adjacent wheel rim flange to form an airtight seal. Air is then introduced into the tire in the conventional manner through the wheel rim valve until desired inflation is achieved. During inflation, the plastic substance is expelled and may be manually removed and/or washed off with water. In the case of large tires, wherein the gap between the side-wall bead and its adjacent wheel rim flange is large, the quantity of the plastic substance used is minimized by first inserting a flexible annulus, such as an inflated tube, into the gap.

7 Claims, 2 Drawing Figures

METHOD FOR MOUNTING AND INFLATING TUBELESS TIRES

BACKGROUND OF THE INVENTION

This invention relates to methods and apparatus for mounting and inflating tubeless vehicle tires on wheel rims. More specifically, it relates to such methods in which a minimum of apparatus is supplemented with the use of a special plastic material to form an airtight seal between the tire and wheel rim.

The difficulty of solving the problem of safely mounting and inflating vehicle tires on wheel rims is indicated by the considerable variety of apparatus that has been invented and that is currently on the market for this purpose. Most of these devices involve elaborate and dangerous hardware.

Tubeless, pneumatic tires are oridinarily mounted on wheel rims in a horizontal position, the side walls of the tire being placed between the wheel rim flanges. In this position, the lower side wall bead of the tire is in contact with the adjacent wheel rim flange and forms an adequate, gastight seal therewith. However, causing the upper side wall bead to form a seal with its adjacent wheel rim flange long enough to inflate the tire has been a considerable problem.

Certain prior art devices for doing this have included bands or belts applied to the tread of the tire that, when tightened, constrict the tire radially to force the upper side wall bead of the tire into sealing contact with its adjacent wheel rim flange until the tire is inflated. Such devices are under a great deal of tension and have been known to break with the release of considerable force, so that they are dangerous to use. Also, they tend to be unsatisfactory when used with recent types of tires, such as radial or belted tires that contain bands or belts of substantially incompressible materials under their treads, such as steel wire or fiber glass.

Some prior art devices include a dome enclosing an annular air chamber that is pressed downwardly to form a seal against the tire side wall to enclose the side and wheel rim during inflation of the tire. Others include an annular band that is used in a similar manner. These devices usually require the use of apparatus for holding the annular sealing means axially against the tire or against both tire and rim. Experience has shown that it is difficult to maintain a gastight seal with both tire and rim as air is introduced under pressure to inflate the tire.

U.S. Pat. Nos. 3,596,698; 3,658,109; 3,654,980; and 3,081,816 teach the use of flexible annuli that are inserted into the gap between the upper side wall bead and its adjacent wheel rim flange. These devices, also, have proved to be unsatisfactory for several reasons; some are flexible but nonelastic, so that an annulus of a different size must be used for each size of tire and wheel rim; those that are elastic are difficult to stretch over the wheel rim flange; and in general, they tend not to provide the intended gastight seal between the surfaces of the tire and wheel rim.

More recent devices have attempted to solve this problem by providing an annular manifold having a ring of tiny orifices through which air under very high pressure is suddenly forced into the gap between the upper tire side wall and the wheel rim flange, as the inflating air is also introduced. This device is also limited to use with tires and wheels of a special range of sizes. Also, air jets are forced through the orifices under such high pressure that they present a constant risk of injury to the operator.

SUMMARY OF THE INVENTION

The present invention, which overcomes these difficulties of the prior art, is a method and apparatus for mounting and inflating tires that is simple, safe, convenient, and reliable.

The tire is placed upon the wheel rim in the conventional manner, with the tire side walls inside the flanges of the wheel rim, and in a horizontal position on some surface such as a floor. A plastic material, having the consistency of bread dough, is then placed into the gap between the upper side wall bead of the tire and its adjacent wheel rim flange. This provides an adequate, gastight seal between tire and wheel rim, so that the tire may be inflated in the conventional manner by introducing air under pressure through the valve in the wheel rim. As the tire is inflated, the plastic substance is gradually forced out of the gap between the tire and rim, so that almost none of its remains in the tire. The plastic material is then scraped off to be used again. Any of it that remains may be easily washed off with water, since the preferred substance contains water soluble materials.

When very large tires and wheels are being mounted, the plastic material may be supplemented with some device to aid in filling the large gap between the upper side wall of the tire and its adjacent wheel rim flange. This device is preferably a flexible, inflated annulus, such as a bicycle inner tube. This minimizes the quantity of the plastic material necessary to mount and inflate a tire on a wheel rim.

Objects of the invention are to provide a means for mounting and inflating a tubeless vehicle tire on a wheel rim that is safe, convenient, reliable, and inexpensive. Important features of the invention are that it requires a minimal amount of apparatus, and that the necessary apparatus is normally found in the typical service station. Other objects and features of the invention will become apparent as the following detailed description is read with reference to the accompanying drawings.

DESCRIPTION OF THE PREFERRED EMBODIMENTS

Figure 1:
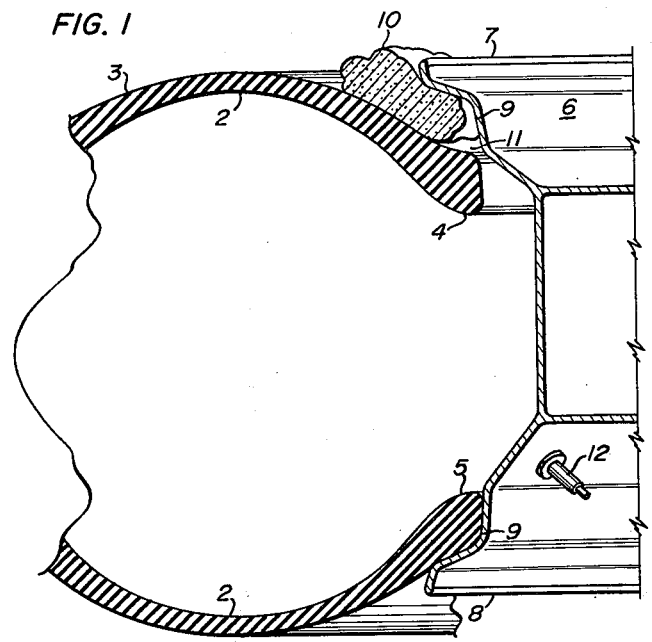
FIG. 1 is a cross section of a tire being mounted on a wheel rim, showing how the plastic material is used therewith.

In reference to FIG. 1, the side walls 2 of the tire 3 terminate in the conventional beads 4 and 5. The tire 3 is placed upon the wheel rim 6 so that the beads 4 and 5 of the tire side walls 2 are inside the flanges 7 and 8 of the rim 6. Both the tire 3 and rim 6 are preferably placed in a horizontal position and on a flat surface, such as a floor, so that the lower bead 5 is automatically seated in the bead seat 9 of the lower flange 8 and forms an airtight seal therewith.

A plastic material 10, of the consistency of bread dough, is then packed into the gap 11 between the upper side wall bead 4 and its adjacent flange 7 of the wheel rim 6 to form an airtight seal therewith. This plastic material 10 must be nontoxic and very pliable. Other desired properties are that it should have a long shelf life; be capable of being used repeatedly; and it should contain water-soluble ingredients, so that any residue left on the tire or wheel may be washed away with water. Many compositions have been found to possess these desired properties and may be used effectively in practicing the present invention. However, in a preferred embodiment of the invention, the following composition is used. The ingredients thereof are inexpensive, plentiful, and readily available. The ingredients of the composition have the following practical ranges, in parts by weight:

|  | Preferred | Range |
|---|---|---|
| Glutinous flour | 45 | 35 – 65 |
| Salt | 16 | 8 – 20 |
| Carbon black | 0.025 | 0 – 0.05 |
| Water | 23 | 14 – 30 |
| Antioxidant | 0.025 | 0 – 0.05 |
| Oil | 21 | 0 – 25 |

The flour is typically wheat flour; the salt can be either sodium chloride or potassium chloride; and up to 50% of the water content may be antifreeze, such as ethylene glycol. A preferred antioxidant is ammonium dichromate. The carbon black is included to enhance the appearance of the composition, and to make it acceptable even after being mixed with the usual dirt and grease encountered when working with tires.

EXAMPLE

Approximately 45 parts of refined wheat flour, 16 parts of granular sodium chloride, 0.025 parts of powdered carbon black, and 0.025 parts of ammonium dichromate were thoroughly mixed together. About 21 parts of mineral oil and 23 parts of water were then slowly added as the mixture was kneaded in the manner of bread dough, until the appropriate, plastic consistency was achieved.

The mixture is stored in a tightly covered container in a cool environment. The sodium chloride and antioxidant function as preservatives so that the composition has a long shelf life and may be used repeatedly. Alum may also be used for this purpose. The sodium chloride also enhances water solubility of the composition.

An advantageous feature of this composition is that it functions as a cleansing agent to the hands of the operator. This is an contrast to most other compositions that are daily used by service station personnel, such as various greases and oils that tend to soil hands and clothing and are difficult to remove. Also, if the plastic material becomes too stiff in consistency, the desired pliability may be easily restored by addition of water.

When the gap 11 between the side wall bead 4 and its adjacent wheel rim flange 7 has been packed with the plastic composition 10, air under pressure is introduced into the tire 3 through the wheel rim valve 12 in the conventional manner. During inflation of the tire 3, the combined pressure of the inflating air and movement of the side wall bead 4 tend to force the plastic material 10 out of the gap 11, so that almost none of it remains in the tire. This action is enhanced by the cohesiveness and elasticity of the plastic material 10, itself. When the tire 3 has been inflated to the desired extent, the plastic material 10 is scraped off and placed in a container to be used repeatedly for mounting other tires. Any material 10 that may remain on the wheel rim 6 or tire 3 is then washed off with water.

In an alternate embodiment of the invention, the plastic composition is supplemented in the gap 11 (see FIG. 2) with a flexible member 13. This minimizes the quantity of the plastic material 10 that would otherwise be necessary, and is used when the gap 11 between the side wall bead 4 and its adjacent flange 7 is very large as in the case of very large tires and wheel rims. The flexible member 13 is preferably circular in cross section. It may be an annulus or an elongated member such as a length of hose or similar material that may be curved to fit into the circular gap 11. A preferred member 13 is an inflated inner tube, such as is used in bicycle tires.

After the member 13 has been placed in the gap 11, the plastic material is packed between it and the adjacent side wall 2 and the adjacent wheel rim flange 7. Otherwise, the procedure for mounting and inflating the tire is identical to the method described above.

Figure 2:
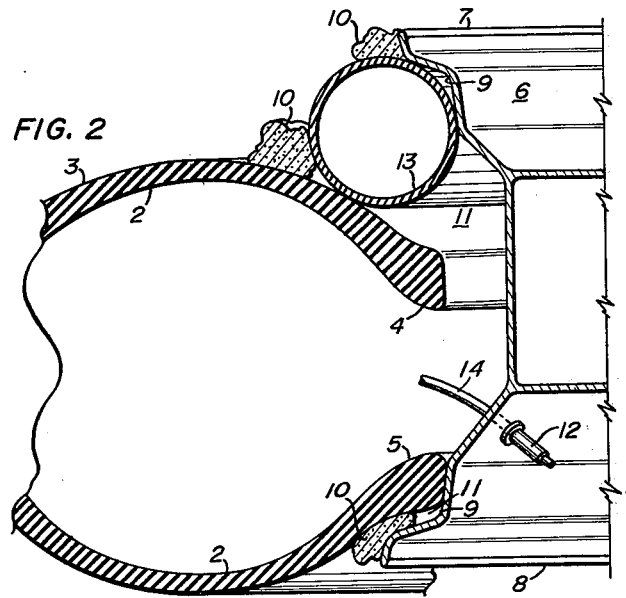
FIG. 2 is a view similar to FIG. 1 but showing how the plastic material may be supplemented with a flexible member to form a gastight seal between tire and rim.

It should be noted that the plastic material 10 may be used to seal one or both beads 4 and 5 to the adjacent wheel rim flanges 7 and 8. Similarly, the flexible member 13 may be used in one or both gaps 11, as a particular situation warrants. In the case of large tires that have been stored in horizontal positions, so that the side walls 2 thereof have been pressed together, it has been found helpful to extend a tube 14 from the valve 12 into the space between the side walls 2, as is shown in FIG. 2.

An invention has been described that represents an advance in the art of mounting tires to wheel rims. Although the preferred embodiments have been described specifically, it should be noted that many details may be altered without departing from the scope of the invention, as it is defined in the following claims.

I claim:

1. The method for mounting and inflating a tubeless, pneumatic tire on a wheel rim comprising the steps of:
   placing the tire on the wheel rim so that its side-wall beads are inside the flanges of the wheel rim;
   filling any gap between a tire side-wall bead and its adjacent wheel-rim flange with partially water soluble material of doughy consistency; and
   introducing pressurized air into the tire, whereby at least one tire bead is forced against the adjacent wheel-rim flange and the partially water soluble doughy material is forced out of the gap.

2. The method of claim 1 wherein the tire is placed on the wheel rim so that one side-wall bead is in contact with its adjacent wheel-rim flange, and the only gap to be filled with the partially water soluble doughy material exists between the opposite tire bead and its adjacent wheel-rim flange.

3. The method of claim 1 wherein at least part of the gap between the tire side-wall bead and its adjacent wheel-rim flange is filled by placing an elongated, flexible member therein before packing the partially water soluble doughy material into the interstices between the flexible member and the tire and rim.

4. The method of claim 3 wherein the flexible member is an inflatable tube.

5. The method of claim 3 wherein the flexible member is an annulus.

6. The method of claim 1 wherein the partially water soluble doughy material in the step of filling the gap between the tire side-wall bead and its adjacent wheel-rim flange comprises, in approximate parts by weight:

| | |
|---|---|
| Glutinous flour | 35 – 65 |
| Salt selected from NaCl and KCl | 8 – 20 |
| Carbon black (powdered) | 0 – 0.05 |
| Water | 14 – 30 |
| Antioxidant | 0 – 0.05 |
| Oil | 0 – 25 |

7. The method for mounting and inflating a tubeless, pneumatic tire on a wheel rim, comprising the steps of:

placing the tire on the wheel rim, in a horizontal position on a surface so that the side-wall beads of the tire are inside the flanges of the wheel rim and the lower bead is seated in the bead seat of the adjacent wheel-rim flange;

filling the gap between the upper side-wall bead and its adjacent wheel-rim flange with a partially water soluble material of doughy consistency to effect an airtight seal between the tire and the wheel rim; and introducing pressurized air into the tire until the desired inflation thereof has been achieved.

* * * * *